United States Patent
Corbett et al.

(10) Patent No.: US 9,126,719 B2
(45) Date of Patent: *Sep. 8, 2015

(54) MANUAL CONTAINER ASSEMBLY AND LINER INTEGRATION FIXTURE FOR PULP-MOLDED SHELL WITH POLYMER LINER CONTAINER SYSTEMS

(71) Applicant: ECOLOGIC, Oakland, CA (US)

(72) Inventors: Julie Corbett, Oakland, CA (US); Romeo Graham, Chelsea (CA); Robert Watters, Ottawa (CA); Michael Sirois, Ottawa (CA)

(73) Assignee: Ecologic, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/190,341

(22) Filed: Feb. 26, 2014

(65) Prior Publication Data

US 2014/0174634 A1   Jun. 26, 2014

Related U.S. Application Data

(63) Continuation of application No. 13/308,002, filed on Nov. 30, 2011, now Pat. No. 8,663,419.

(60) Provisional application No. 61/418,373, filed on Nov. 30, 2010.

(51) Int. Cl.
*B65D 8/00* (2006.01)
*B65D 6/00* (2006.01)
(Continued)

(52) U.S. Cl.
CPC ............... *B65D 11/02* (2013.01); *B65D 11/20* (2013.01); *D21J 3/10* (2013.01); *B29C 65/483* (2013.01); *B29C 65/4815* (2013.01); *B29C 65/4825* (2013.01); *B29C 65/7841* (2013.01); *B29C 66/131* (2013.01); *B29C 66/5344* (2013.01);
(Continued)

(58) Field of Classification Search
CPC .. B29C 65/48; B29C 65/7841; B29C 66/131; B29C 66/5344; B29C 66/54; B29C 65/4825; B29C 65/483; B29C 65/4815; D21J 3/10
USPC ......................................................... 156/287
See application file for complete search history.

(56) References Cited

U.S. PATENT DOCUMENTS 1,452,039 A   4/1923   Gravell
D99,757 S     5/1936   Dallas
(Continued)

FOREIGN PATENT DOCUMENTS

AU   2006323498 A1   6/2007
AU   2012211504 A1   8/2012
(Continued)

OTHER PUBLICATIONS

International Search Report and Written Opinion Dated Apr. 25, 2007 for PCT Application No. GB2006/004534.
(Continued)

*Primary Examiner* — Philip Tucker
*Assistant Examiner* — Vicki Wu
(74) *Attorney, Agent, or Firm* — Loeb & Loeb LLP

(57) ABSTRACT

A method of using a assembly facilitator for a pulp-molded shell with polymer liner containing systems to precisely create a integral pulp molded shell is disclosed along with the assembly facilitator itself.

19 Claims, 11 Drawing Sheets

(51) Int. Cl.
*D21J 3/10* (2006.01)
*B29C 65/78* (2006.01)
*B29C 65/00* (2006.01)
*B29L 31/00* (2006.01)
*B29C 65/48* (2006.01)

(52) U.S. Cl.
CPC .............. *B29C 66/54* (2013.01); *B29C 66/8324* (2013.01); *B29L 2031/7158* (2013.01); *Y10T 156/10* (2015.01)

(56) References Cited

U.S. PATENT DOCUMENTS

| | | |
|---|---|---|
| 2,562,389 A | 7/1951 | Piazze |
| 2,822,965 A | 2/1958 | Smith et al. |
| 2,954,901 A | 10/1960 | Winstead |
| D192,535 S | 4/1962 | Laudano |
| 3,119,543 A | 1/1964 | Walker |
| D198,404 S | 6/1964 | Busch |
| D198,407 S | 6/1964 | Busch |
| D201,213 S | 5/1965 | Petitto |
| 3,255,932 A | 6/1966 | Hunter et al. |
| 3,450,254 A | 6/1969 | Miles |
| 3,461,491 A | 8/1969 | Matthias et al. |
| 3,508,473 A | 4/1970 | Ericson |
| D217,439 S | 5/1970 | Platte |
| 3,610,455 A | 10/1971 | Greenhalgh et al. |
| 3,625,270 A | 12/1971 | Skendzic |
| 3,788,374 A | 1/1974 | Saijo |
| 3,935,993 A | 2/1976 | Doyen et al. |
| 3,941,301 A | 3/1976 | Jorgensen |
| 4,065,286 A | 12/1977 | Becker |
| 4,226,330 A | 10/1980 | Butler |
| D258,117 S | 2/1981 | Bashour |
| 4,265,373 A | 5/1981 | Stoody |
| 4,282,984 A | 8/1981 | Curry, Jr. |
| 4,330,066 A | 5/1982 | Berliner |
| 4,353,497 A | 10/1982 | Bustin |
| 4,458,830 A | 7/1984 | Werding |
| 4,532,976 A | 8/1985 | Chandley |
| 4,601,694 A | 7/1986 | Ausnit |
| RE32,354 E | 2/1987 | Savage |
| 4,658,433 A | 4/1987 | Savicki |
| 4,671,421 A | 6/1987 | Reiber et al. |
| 4,671,763 A | 6/1987 | Weiler |
| 4,696,416 A | 9/1987 | Muckenfuhs et al. |
| 4,706,829 A | 11/1987 | Li |
| 4,709,528 A | 12/1987 | Merkus |
| 4,712,711 A | 12/1987 | Geering et al. |
| 4,762,486 A | 8/1988 | Windstrup et al. |
| 4,773,560 A | 9/1988 | Kittscher |
| 4,817,830 A | 4/1989 | Yavorsky |
| 4,830,234 A | 5/1989 | Odet |
| 4,836,419 A | 6/1989 | Metz et al. |
| 4,837,849 A | 6/1989 | Erickson et al. |
| 4,838,429 A | 6/1989 | Fabisiewicz et al. |
| 4,863,067 A | 9/1989 | Krall |
| 4,890,770 A | 1/1990 | Haga et al. |
| D305,980 S | 2/1990 | Binder et al. |
| 4,917,268 A | 4/1990 | Campbell et al. |
| 4,917,269 A | 4/1990 | Fuchs et al. |
| 4,974,749 A | 12/1990 | Mon |
| 4,981,239 A | 1/1991 | Cappel et al. |
| 4,984,714 A | 1/1991 | Sledge |
| 4,993,605 A | 2/1991 | Del'Re |
| 5,058,772 A | 10/1991 | Moore et al. |
| 5,108,009 A | 4/1992 | Davidson et al. |
| 5,114,659 A | 5/1992 | Krall |
| 5,131,566 A | 7/1992 | Bavegems |
| 5,203,470 A | 4/1993 | Brown |
| 5,207,356 A | 5/1993 | Krall |
| 5,234,130 A | 8/1993 | Benioff et al. |
| 5,251,788 A | 10/1993 | Moore |
| 5,288,531 A | 2/1994 | Falla et al. |
| 5,363,966 A | 11/1994 | Czech et al. |
| 5,429,263 A | 7/1995 | Haubenwallner |
| 5,431,306 A | 7/1995 | Reid |
| 5,477,974 A | 12/1995 | Reil et al. |
| D368,660 S | 4/1996 | Terwilleger et al. |
| D372,429 S | 8/1996 | Slezak et al. |
| D373,533 S | 9/1996 | Lathrop et al. |
| D373,535 S | 9/1996 | Lathrop et al. |
| D374,179 S | 10/1996 | Lathrop et al. |
| 5,566,862 A | 10/1996 | Haffner et al. |
| D376,761 S | 12/1996 | Lathrop et al. |
| 5,597,090 A | 1/1997 | Leahy |
| 5,603,787 A | 2/1997 | Reid |
| 5,715,992 A | 2/1998 | Andrews, Sr. et al. |
| 5,735,422 A | 4/1998 | Binter |
| 5,794,803 A | 8/1998 | Sprick |
| D401,506 S | 11/1998 | Collins, II et al. |
| 5,855,299 A | 1/1999 | Arnold et al. |
| 5,860,555 A | 1/1999 | Mayled |
| D408,742 S | 4/1999 | Goettner |
| 5,890,616 A | 4/1999 | Cravens et al. |
| 5,909,841 A | 6/1999 | Andrews, Sr. et al. |
| 5,941,422 A | 8/1999 | Struble |
| 5,996,427 A | 12/1999 | Masek et al. |
| 6,032,829 A | 3/2000 | Geisinger et al. |
| 6,050,432 A | 4/2000 | Koehnke |
| D429,465 S | 8/2000 | Weeden |
| 6,123,231 A | 9/2000 | Geisinger |
| 6,142,344 A | 11/2000 | Kai |
| 6,196,452 B1 | 3/2001 | Andrews, Sr. et al. |
| 6,206,571 B1 | 3/2001 | Olin |
| 6,209,762 B1 | 4/2001 | Haffner et al. |
| 6,223,945 B1 | 5/2001 | Giblin et al. |
| 6,233,946 B1 | 5/2001 | Masuda |
| 6,237,308 B1 | 5/2001 | Quintin et al. |
| 6,279,789 B1 | 8/2001 | Krall |
| 6,290,124 B2 | 9/2001 | Andrews, Sr. et al. |
| 6,295,792 B1 | 10/2001 | Linner |
| 6,331,028 B1 | 12/2001 | O'Neill et al. |
| 6,375,041 B1 | 4/2002 | Klima et al. |
| 6,398,076 B1 | 6/2002 | Giblin et al. |
| 6,416,223 B2 | 7/2002 | de Laforcade |
| 6,431,401 B1 | 8/2002 | Giblin et al. |
| 6,454,134 B1 | 9/2002 | Aujesky et al. |
| 6,464,106 B1 | 10/2002 | Giblin et al. |
| 6,477,820 B1 | 11/2002 | Dutra et al. |
| D471,111 S | 3/2003 | Kuzma et al. |
| 6,651,845 B1 | 11/2003 | Schroeder |
| 6,783,277 B2 | 8/2004 | Edwards et al. |
| 6,794,053 B2 | 9/2004 | Quintin et al. |
| 6,796,785 B2 | 9/2004 | Kawamoto et al. |
| 6,826,892 B2 | 12/2004 | Basque et al. |
| 6,857,779 B2 | 2/2005 | Olin |
| 6,874,299 B2 | 4/2005 | Basque |
| D508,206 S | 8/2005 | Meeker et al. |
| 6,968,980 B2 | 11/2005 | Giblin et al. |
| 6,994,772 B2 | 2/2006 | Kimbara et al. |
| 7,076,935 B2 | 7/2006 | Basque |
| D543,466 S | 5/2007 | Little et al. |
| 7,219,481 B2 | 5/2007 | Buchman et al. |
| D543,852 S | 6/2007 | Warren |
| 7,281,360 B1 | 10/2007 | Larimore et al. |
| 7,340,870 B2 | 3/2008 | Roger |
| 7,686,188 B2 | 3/2010 | Stebick et al. |
| 7,721,916 B2 | 5/2010 | Szekely |
| D645,754 S | 9/2011 | Corbett et al. |
| D645,755 S | 9/2011 | Corbett et al. |
| 8,663,419 B2 * | 3/2014 | Corbett et al. ............. 156/287 |
| D720,227 S | 12/2014 | Corbett et al. |
| 2002/0189776 A1* | 12/2002 | Kumamoto et al. ......... 162/218 |
| 2005/0133578 A1 | 6/2005 | Farha et al. |
| 2005/0167319 A1 | 8/2005 | Girondi et al. |
| 2006/0062497 A1 | 3/2006 | Murray |
| 2006/0111224 A1 | 5/2006 | Caudle |
| 2006/0230588 A1 | 10/2006 | Sprehe |
| 2007/0211967 A1 | 9/2007 | Murray |
| 2008/0083777 A1 | 4/2008 | Lips |
| 2008/0185405 A1 | 8/2008 | Murray |
| 2008/0210584 A1 | 9/2008 | Barthel et al. |
| 2008/0267540 A1 | 10/2008 | Ashworth |

(56) References Cited

U.S. PATENT DOCUMENTS

| | | |
|---|---|---|
| 2009/0057381 A1 | 3/2009 | Gokhale |
| 2010/0242414 A1 | 9/2010 | Tauber et al. |
| 2011/0036846 A1 | 2/2011 | Corbett et al. |
| 2011/0220652 A1 | 9/2011 | Corbett et al. |

FOREIGN PATENT DOCUMENTS

| | | |
|---|---|---|
| CA | 2799090 A1 | 11/2011 |
| DE | 4401719 A1 | 7/1994 |
| DE | 4424936 A1 | 1/1995 |
| EP | 0134142 A2 | 3/1985 |
| EP | 0302600 A1 | 2/1989 |
| EP | 0590424 A1 | 4/1994 |
| EP | 0785023 A1 | 7/1997 |
| EP | 1739025 A1 | 1/2007 |
| EP | 2338807 A1 | 6/2011 |
| EP | 2361847 A1 | 8/2011 |
| FR | 1287487 A | 3/1962 |
| GB | 16490 | 6/1916 |
| GB | 1207421 A | 9/1970 |
| GB | 05247895 | 12/2005 |
| GB | 06111371 | 6/2006 |
| GB | 2432829 A | 6/2007 |
| GB | 08076978 | 4/2008 |
| GB | 08076986 | 4/2008 |
| GB | 08110983 | 6/2008 |
| GB | 08185514 | 10/2008 |
| JP | 11-059726 | 3/1999 |
| JP | 2000043901 A | 2/2000 |
| JP | 2001287260 A | 10/2001 |
| KR | 20-0379463 Y1 | 3/2005 |
| KR | 20080084951 A | 9/2008 |
| WO | 9315967 A1 | 8/1993 |
| WO | 9419242 A1 | 9/1994 |
| WO | 9419255 A1 | 9/1994 |
| WO | 9746465 A1 | 12/1997 |
| WO | 03018802 A1 | 3/2003 |
| WO | 03033376 A1 | 4/2003 |
| WO | 2005054068 A1 | 6/2005 |
| WO | 2007060450 A2 | 5/2007 |
| WO | 2007066090 A1 | 6/2007 |
| WO | 2007126044 A1 | 11/2007 |
| WO | 2008103649 A2 | 8/2008 |
| WO | 2009133355 A1 | 11/2009 |
| WO | 2009133359 A1 | 11/2009 |
| WO | 2009153558 A1 | 12/2009 |
| WO | 2011141696 A1 | 11/2011 |
| WO | 2011157999 A2 | 12/2011 |
| WO | 2011158000 A1 | 12/2011 |

OTHER PUBLICATIONS

International Search Report Dated Mar. 25, 2010 for PCT Application PCT/US2009/056754.
International Search Report and Written Opinion Dated Aug. 12, 2011 for PCT Application No. US2012/027744.
International Search Report and Written Opinion Dated Jul. 27, 2012 for PCT Application No. US2011/064035.
International Search Report and Written Opinion Dated Dec. 14, 2012 for PCT Application No. US2012/054035.

* cited by examiner

MANUAL CONTAINER ASSEMBLY AND LINER INTEGRATION FIXTURE FOR PULP-MOLDED SHELL WITH POLYMER LINER CONTAINER SYSTEMS

PRIORITY

This application is a continuation of U.S. application Ser. No. 13/308,002, entitled "MANUAL CONTAINER ASSEMBLY AND LINER INTEGRATION FIXTURE FOR PULP-MOLDED SHELL WITH POLYMER LINER CONTAINER SYSTEMS," filed Nov. 30, 2011, now U.S. Pat. No. 8,663,419 which is the Non-Provisional application of U.S. Provisional Application Ser. No. 61/418,373, entitled "MANUAL CONTAINER ASSEMBLY AND LINER INTEGRATION FIXTURE FOR PULP-MOLDED SHELL WITH POLYMER LINER CONTAINER SYSTEMS," filed Nov. 30, 2010, the entire disclosures of which are hereby incorporated herein by reference in their entireties.

BACKGROUND

Packaging used for containing liquids can generate large amounts of waste. In some cases, packaging used for containing liquids can be recycled. Packaging used for containing liquids has been described in PCT publication No. WO 2007/0066090, which is herein incorporated by reference in its entirety.

Efforts towards creating an environmentally efficient container/package system that is cost effective, carbon effective and readily recyclable while being very usable for dispensing liquids, aggregates or powders and performing as a container for distribution through typical retail logistic chains have been increasing.

Typical bottles are made of a unified volumetric structure, such as blown glass bottles and blow molded plastic bottles. These bottle are created seamless and with an opening for transmission of fluids/powders. Trying to reliably and repeatedly manufacture a two part pulp moulded shell that is biodegadable and that holds an inner liner has proven to be a challenge. Moulded pulp can be moulded into many shapes and the tolerances are improving but the tolerances are not as tight as with other materials. Pulp formed parts can be made in a matched tool process to achieve a certain degree of dimensional part tolerance. Much of the final dimensions of a given part are dependent on the processing. These include processing temperatures, additives to the pulp slurry, the type of fiber used, etc. Hence, there is a need to bring these parts together permanently to achieve an enclosed volume, and to permanently capture the fitment. As identified in our prior application the ecologic bottle is an assembly of an outer (molded pulp) shell, an internal liner (which may comprise an assembly of a polymer pouch and a polymer fitment) and a mated/keyed connection to a fitment or spout. The pulp shell is made of open parts during the two part pulp-molding process.

Following production of shell parts, they are typically stacked and moved to the point of assembly. The stacking can deform the parts out of specification and desired tolerances. Parts from the bottom of a shipping stack are splayed out from top loading, and upper parts can be squeezed together and be smaller than the moulded condition. There is a need to control the process where these parts come together. There is a need ensure correct tolerances are met during the bottle assembly process. There is a need to make this assembly process efficient and reliable in order to minimize the cost of assembly and the cost of the final bottle.

SUMMARY

A method of using a assembly facilitator for a pulp-molded shell with polymer liner containing systems to precisely create a integral pulp molded shell is disclosed along with the assembly facilitator itself. A first surface of a first half and a second surface of a second half may be received by a connection facilitator. The connection facilitator may be prepared for connection and the assembly device may be set in an open position. A pulp shell may be inserted into the dedicated cavities of the device and a fitment with the liner may be registered and inserted into the assembly device. The fitment may be aligned with the alignment protuberance and the device may be closed to bring the pulp shell parts together in a controlled and aligned way around the fitment and the liner. Pressurized gas may be introduced into the liner through the fitment to prepare the liner to be easily filled.

INCORPORATION BY REFERENCE

All publications, patents and patent applications mentioned in this specification are herein incorporated by reference to the same extent as if each individual publication, patent or patent application was specifically and individually indicated to be incorporated by reference.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
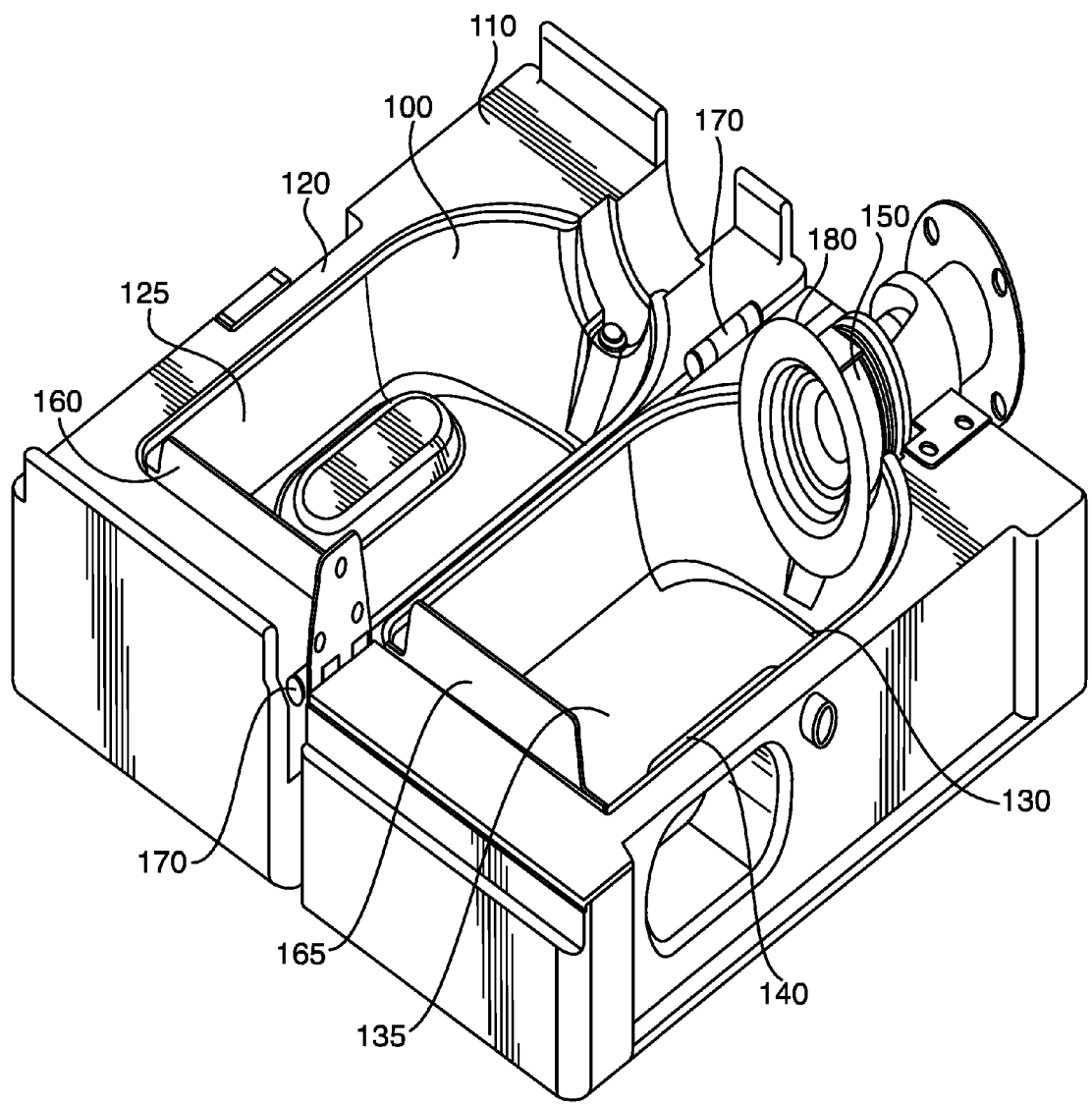
FIG. 1 is an illustration of an assembly unit and container.

The described method, process and device are used to create a container 100 illustrated in FIG. 1. The container 100 may be biodegradable and may be separable by the end user. The container 100 is an example of a new use for molded pulp, of which there are few examples on the market. The molded pulp container 100 with separable liner is offered as primary packaging (in contrast to secondary packaging, such as is found in shock protection for shipping fragile goods), and requires a higher level of finish and apparent quality for consumer acceptance. For this reason, the fixture is novel and useful to achieve the desired quality levels with traditionally lower-quality materials. In addition, the consistency and predictability of pulp created products is less than other materials, making creating consistent and reliable products of pulp even more challenging. Thus, new methods and apparatus are needed to create consistent products molded from pulp than remain biodegradable.

The described method, process and assembly unit 110 have been conceived is to aid in the forming and assembly of parts into an empty container 100 that is designed to hold a liner that is filled with a liquid. With some adjustments, the method, process and device may also be used for the assembly of already filled liners with fitments and caps into a formed pulp shell of the container 100. In some embodiments, this container 100 itself can then be filled with fluid or other material, such as a traditional bottle. The word 'bottle' is not meant to be limiting, as there are many package configurations that the system could satisfy including cartridges, containers, jars, dispensers for towels, tissues, wipes, etc. Contents, as always, could include liquid, particulates, powders, items, etc. The apparatus 110 assists in ensuring that the container 100 parts such as halves line up in a precise manner to ensure that the container 100 has structural rigidity to hold liquids but still be able to be separated by user such that the container 100 shell and liner may be separated and recycled.

Figure 2:
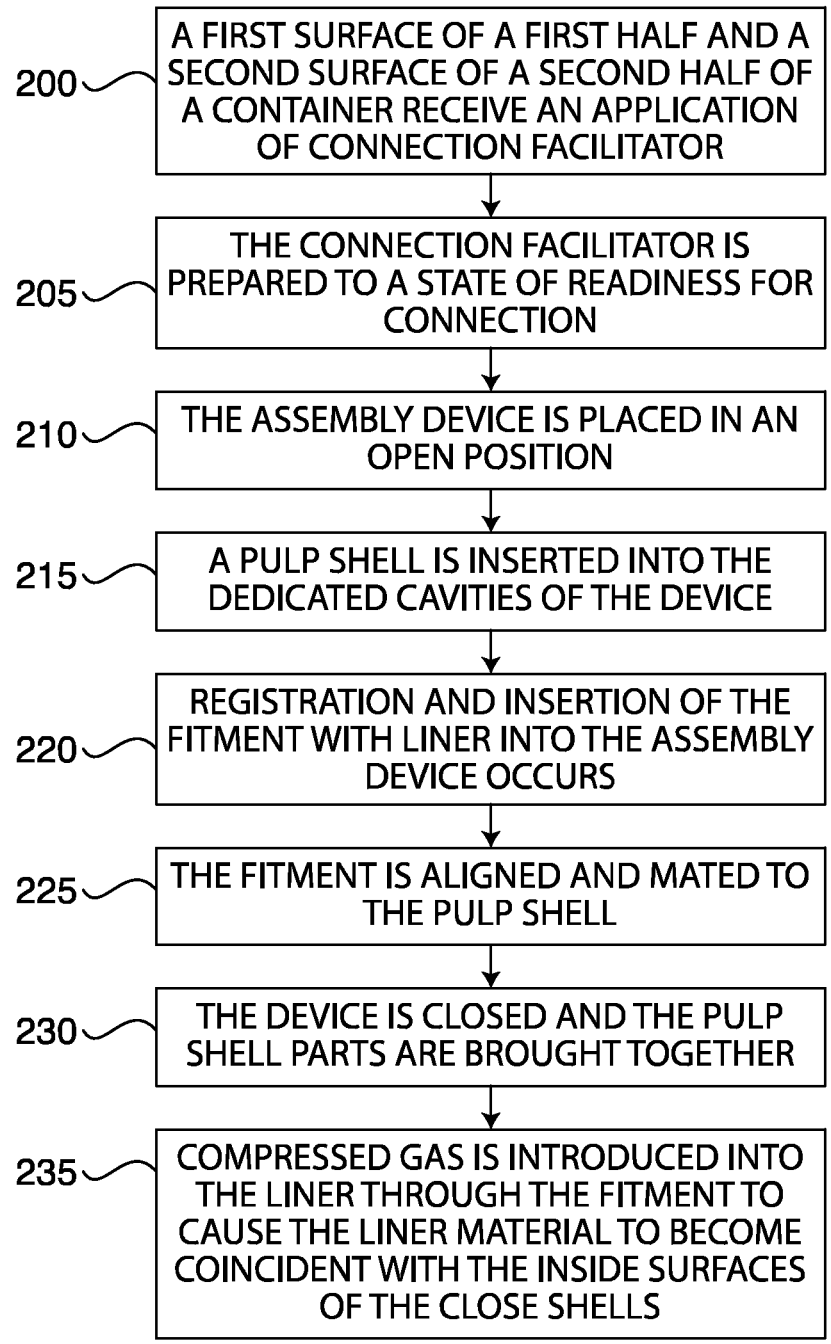
FIG. 2 is an illustration of a method of using the assembly unit to create a container.

FIG. 2 may be an illustration of a method of using the assembly unit to create a container. At block 200, a first surface 120 of a first portion 125 and a second surface 130 of a second portion 135 may receive an application of connection facilitator 140. In some embodiments, the connection facilitator is a mechanical connection. In other embodiments, the connection facilitator is a physical connection. In some additional embodiments, the connection facilitator is an adhesive 140 that, when dry, forms a permanent bond if the first surface 120 and second surfaces 130 coated with the adhesive 140 are brought together with some degree of pressure (commonly known as contact cement). In some embodiments, only the first surface 120 or second surface 130 receives the application of adhesive 140. In addition, there may be embodiments where the container 100 may be made from more than two portions or halves 125 135 but may be made from several parts that are connected together, through adhesive 140 or through other appropriate manners of connection.

In some embodiments the adhesive 140 is applied to the first surface 120 and or second surface 130 to be connected prior to assembly. As an example and not limitation, contact cement may be applied as the adhesive 140 and allowed to dry prior to the use of the bottle assembly device 110. The adhesive 140 could be a decal adhesive, a pressure sensitive adhesive, a heat activated adhesive, a hot melt adhesive, or any appropriate adhesive. In addition, mechanical or physical connections may be possible and are contemplated.

In some additional embodiments, it is conceived that adhesive 140 may be applied to the pulp shell gluing surfaces (first surface 120 and second surface 130) while in the bottle assembly device 140. The bottle assembly device 140 could retain the pulp part of the container 100 in its correct dimensional shape while the adhesive 140 is applied to specific areas of the pulp shell container 100. This adhesive 140 application could be automated for precise dosing and location or it could be applied manually by an operator. Features on the bottle assembly device 110 could aid in the controlled application of the adhesive 140. This could include guide channels to allow a roller-style adhesive applicator to follow.

The assembly unit 110 could have features to function with a glue application unit (not shown). The operator could load the open bottle assembly device 110 into the glue application unit, glue be applied, the assembly unit be removed, and the bottle assembly unit 110 be closed by an operator unify the first pulp shell 125 and second pulp shell 135 into bottle. It is important that the closing of the shells 125 135 happen within the 'open time' of the adhesive 140. It should be noted that the fitment/liner 150 could be inserted prior to adhesive 140 application or following the adhesive 140 application.

In some versions of the bottle 100, the base 160 is formed from two flaps that overlap. There may be a need for a ramp like feature 165 that positions the desired interior flap to the inside so that there is no interference on closing of the device 110. The bottom 160 could also have 'split interlock flanges' or other arrangements that need to be controlled upon closing.

At block 205, the connection facilitator 140 is prepared to a state of readiness for correction. In some embodiments, the connection facilitator 140 may be an adhesive 140 and will need to dry. In other embodiments, a necessary heat may be required to prepare the adhesive 140. In yet another embodiment, a necessary pressure may be required to prepare the adhesive 140. In mechanical adhesion embodiments, the necessary protrusions and protrusion receivers may have to be formed and shaped to be able to have the sides 135 125 adhere. Of course, other embodiments are possible and are contemplated.

At block 210, the assembly device 110 may be placed in an open position. The assembly device 110 may have cavities 400 (FIG. 4) that match the outer surfaces of the formed pulp container 110. Upon insertion of the pulp shells 125 135 into the device 110, the pulp shells 125 135 are brought into specification dimensionally. This happens to all segments of the shell 125 135 thereby setting mating parts to be similar.

Upon closing of the assembly device 110, the pulp parts 125 135 are brought together with specific mating features of the hinged-ly opposed segments brought together. This controlled engagement allows the assembled bottle 110 to benefit from inter-connection between matching flanges, of tongue into groove channels, of tabs into slots, or male protrusion into female recess. The assembly device 110 facilitates making these connections. In some embodiments mechanical connections are sufficient, in other instances the combination of adhesive and mechanical connections offers the most strength and structural performance.

Figure 3:
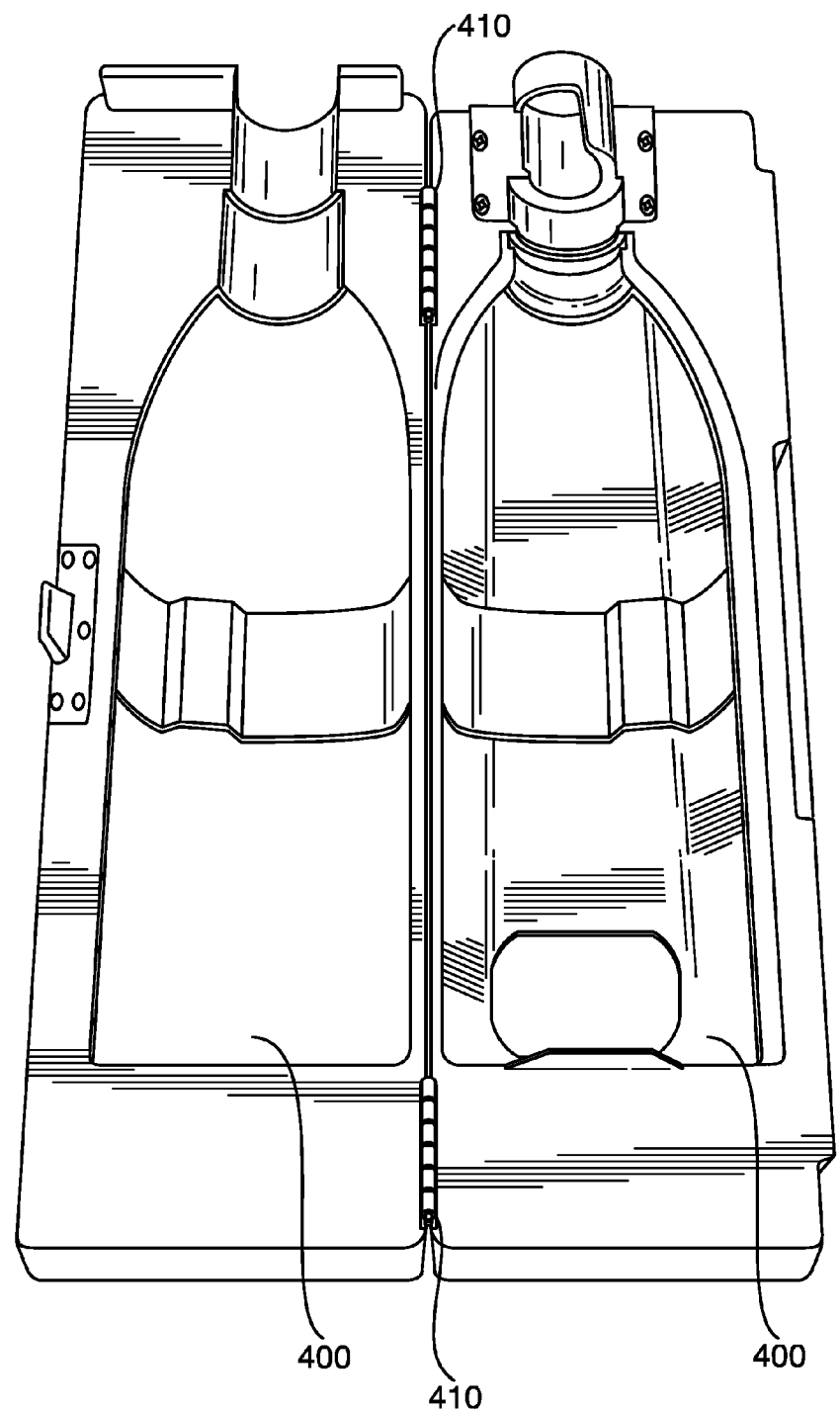
FIG. 3 is an illustration of an assembly unit.
Figure 4:
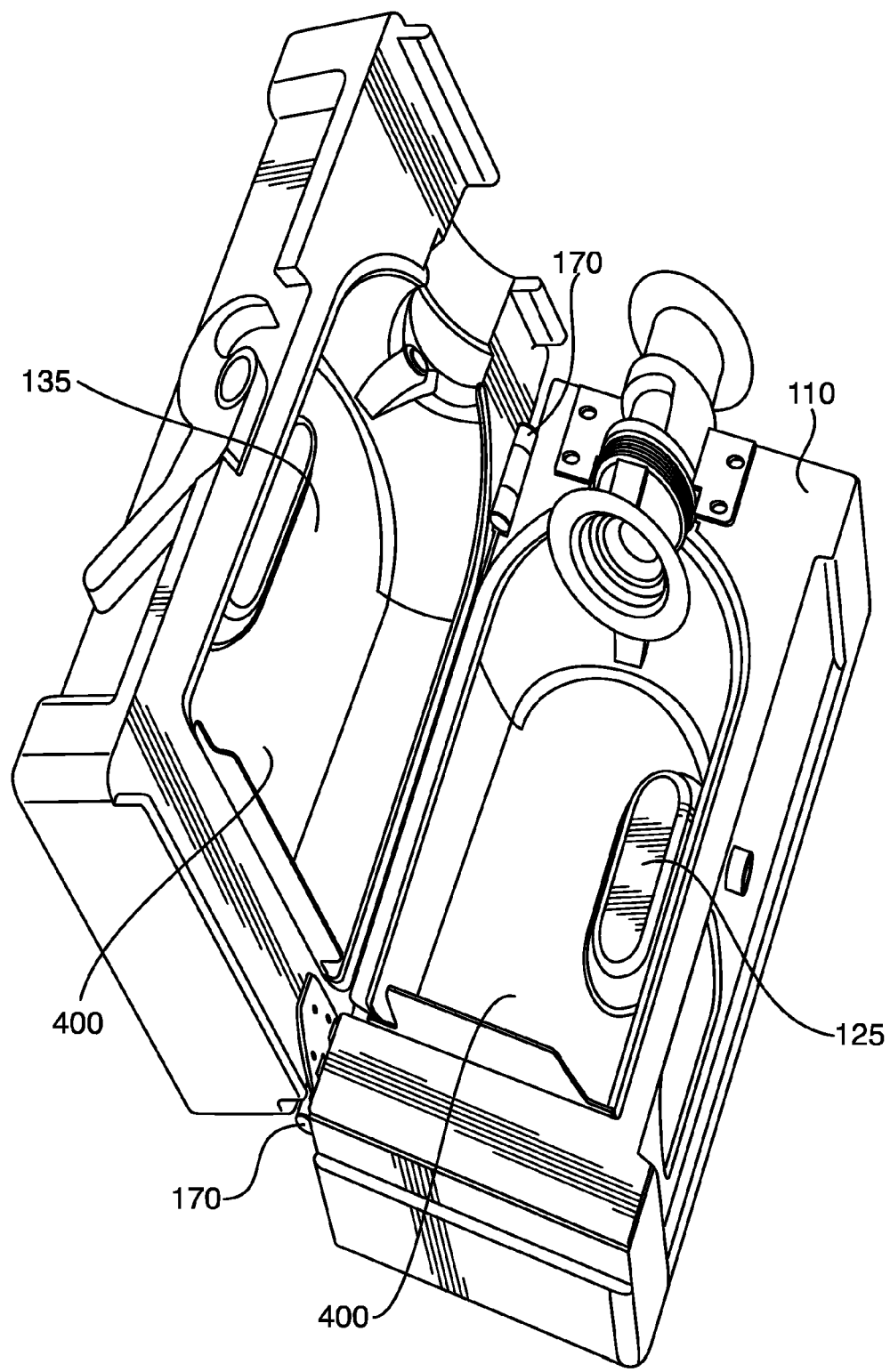
FIG. 4 is an illustration of an assembly unit and container in an open position.

The assembly and integration fixture 110 can comprise one or more hinged connections 170 between shell cavities 400 (FIGS. 3 and 4). A hinge location 180 can be in axial alignment with a hinge of the pulp shell of the container 100. In other embodiments, the device 100 assembly's hinge 170 is parallel to a pulp shell's 100 hinge but with a dimensional offset in order to achieve optimal compression between the pulp shell 100 features. This relationship could be adjustable. Of course, the pulp shell 100 may be separate pieces without a hinge or could be more than two pieces that are connected together to form the container 100. In this case, hinges may be required on the integration fixture 110 to bring the parts of the container together, but the hinges may or may not be aligned to any particular feature of the shell parts. Of course, other means to moveably connect together the parts of the fixture, such as rods, pivots, guides, slots, chains, pistons, axles, are possible and are contemplated.

Figure 5:
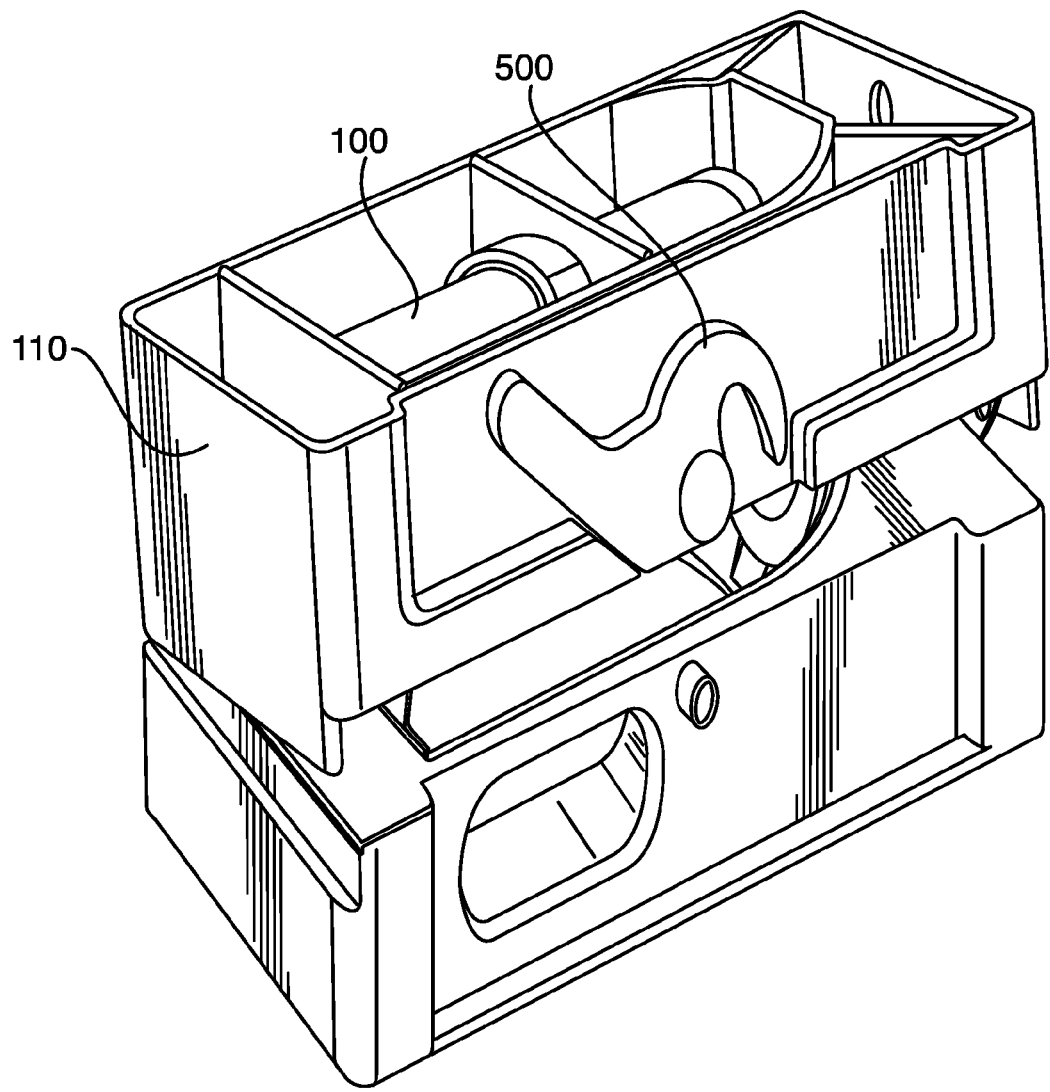
FIG. 5 is an illustration of an assembly unit and container in a closed position.

There could also be features on the assembly device 110 to lock the assembly device closed for the period of time required for glue curing. There could also be a force controlling feature to ensure a specific pressure is applied to the glue surfaces. The fixture 110 can include a latch system 500 (FIG. 5) to provide pressure upon the flanges 125 135 during a period of time required to obtain a sufficient bond. Depending on the adhesive used or the mechanical connection method used, the time and pressure required could vary widely. In an embodiment, a cam-style latch 500 is employed to give the operator flexibility in the amount of pressure exerted on the joint and in the amount of time the pressure is applied. It could be momentary, or last until the fixture is opened and the container removed.

At block 215, a pulp shell 125 135 may be inserted into the dedicated cavities 400 of the device 110. The innovation of the multi-component bottle 100 for ease of end-use separability requires a non-intuitive process for assembly. In low volumes, the insertion may be a manual process with mechanical assist. Without some mechanical assist, the process of assembling a bottle 100 may be time consuming since a number of items need to be aligned together as the pulp shells 125 135 are brought together and closed. Also, without mechanical assistance, the quality of assembly (precision, alignment, registration, etc) is lower than desired.

At block 220, registration and insertion of the fitment 150 with liner into the assembly device 110 may occur. The liner (not shown) may need to be placed within the outer perimeter of the shell 125 135 so that when the pulp perimeter parts 125 135 are closed together and adhesive 140 at the flanges exists, the liner is not exiting the closed container 100 shell or else the liner would be stuck between the connecting areas 125 135 of the closed shell of the container 100. The operator may fold or compress the liner into this more compact state or the liner may be pre-folded. The liner may be pre-folded and be held in the desired configuration with an adhesive tape, a paper loop, an adhesive patch, etc. Of course, other methods of retaining the liner in the correct configuration for inserting are possible and are contemplated.

Figure 10:
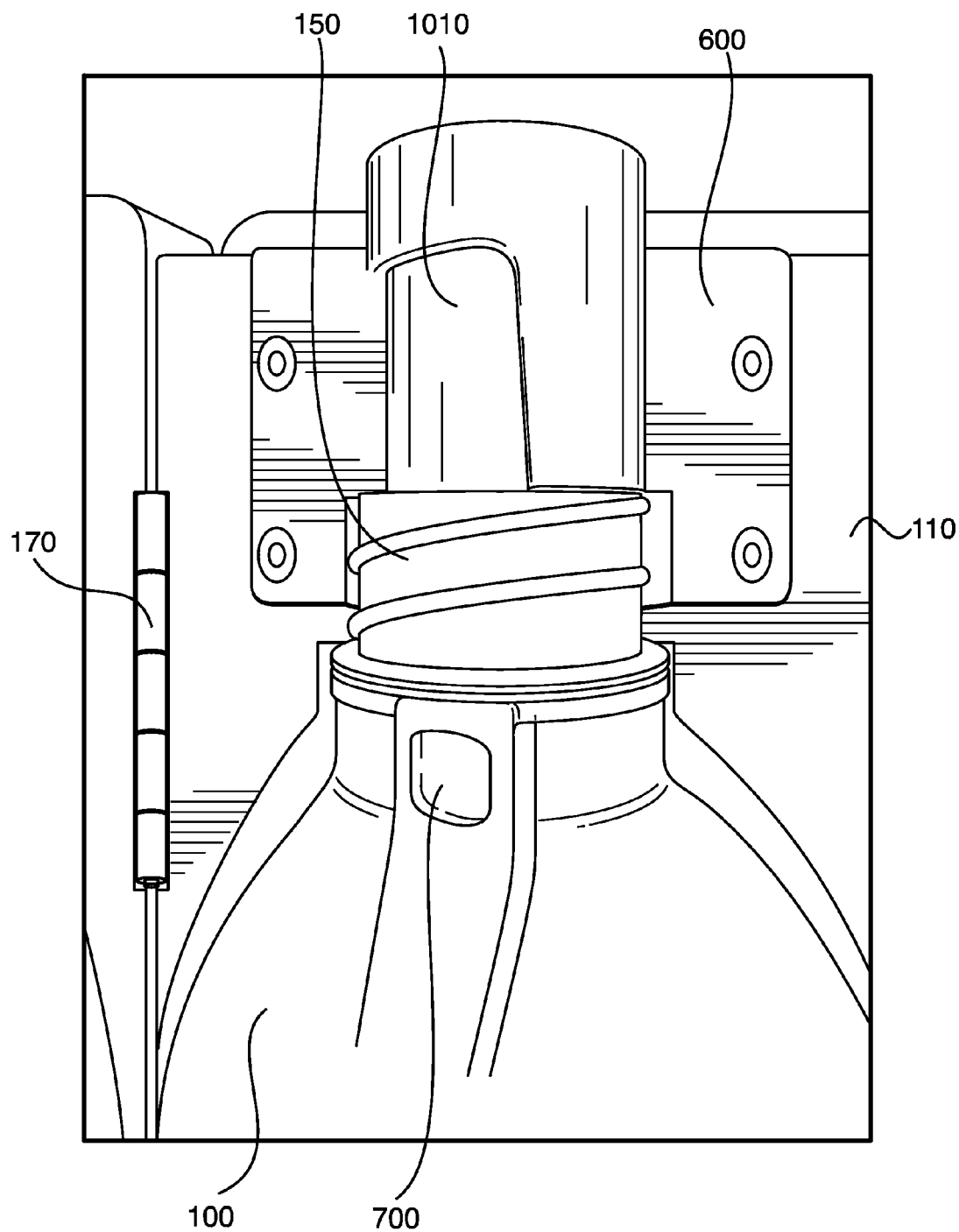
FIG. 10 is an illustration of an open assembly unit with the retention feature holding the fitment in place using the alignment protuberance.
Figure 11:
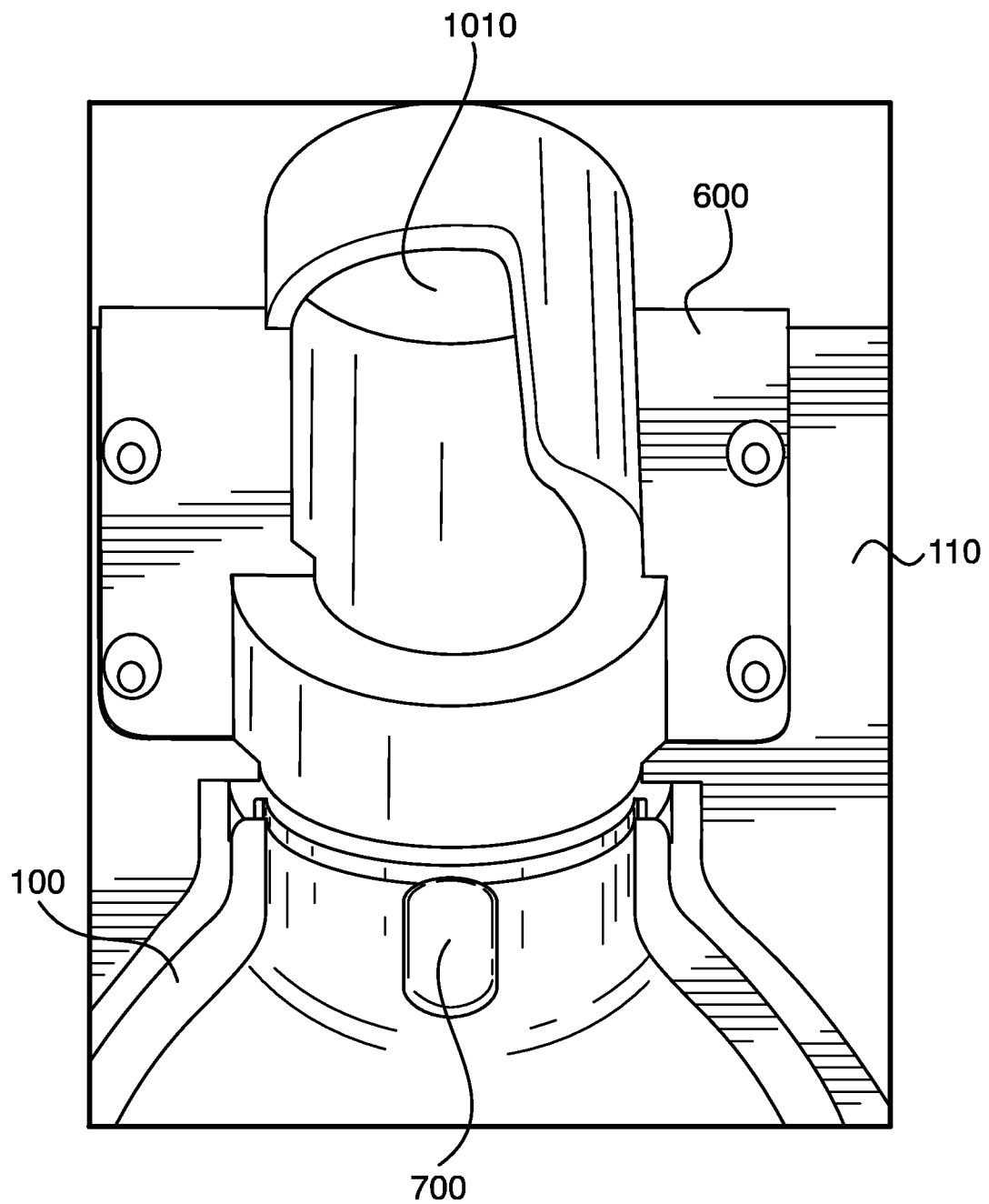
FIG. 11 is an illustration of the retention feature and the alignment protuberance in an open position.

At block 225, the fitment 150 may be also aligned and mated to the pulp shell 125 135. The fitment 150 may have a device to ensure that the fitment 150 attached to the liner may not turn when the mechanical capper applies the cap in the commercial filling process or when a user attempts to unscrew a cap or top on the container 100. In one embodiment, the container 100 may contain an alignment protuberance 700 (FIGS. 10 and 11). The fitment 150 may have vertical members that fit around the alignment protuberance 700. In addition, in some embodiments, the fitment 150 may also have a horizontal member that fits around the protuberance 700 and keeps the liner and fitment 150 from unintentionally being pulled out of the container 100.

At block 230, the device 110 may be closed and the pulp shell parts 125 135 may be brought together in a controlled and aligned way around the fitment 150 and the liner. This captures and locates the fitment 150 in place by specific features in the shell parts 125 135, and is possible because the materials of the fixture are more rigid than the material of the pulp molded shell or liner. It is known that there is a range of materials typically used for manufacturing fixtures and equipment. Such materials are possible and are contemplated. Upon closing of the assembly device 110, the pulp parts 125 135 are brought together with specific mating features of the hingedly opposed segments brought together. This controlled engagement allows the assembled bottle 100 to benefit from inter-connection between matching flanges 125 135, of tongue into groove channels, of tabs into slots, or male protrusion into female recess. The assembly device 110 facilitates making these connections. In some embodiments mechanical connections are sufficient, in other instances the combination of adhesive and mechanical connections offers the most strength and structural performance.

At block 235, compressed gas may be introduced into the liner through the fitment 150 to cause the liner material to become coincident with the inside surfaces of the close shells 125 135. After assembly of the bottle 100 and prior to filling, it may be desirable to have the liner expanded so that it does not act to obstruct the filling process, or to prevent the desired volume of material to be placed in the container during the filling process. The assembly device 110 may also function to assist with the application of pressurized gas into the bottle 100. The assembly device 110 may be the interface between the fitment 150 and the air supply.

Figure 6:
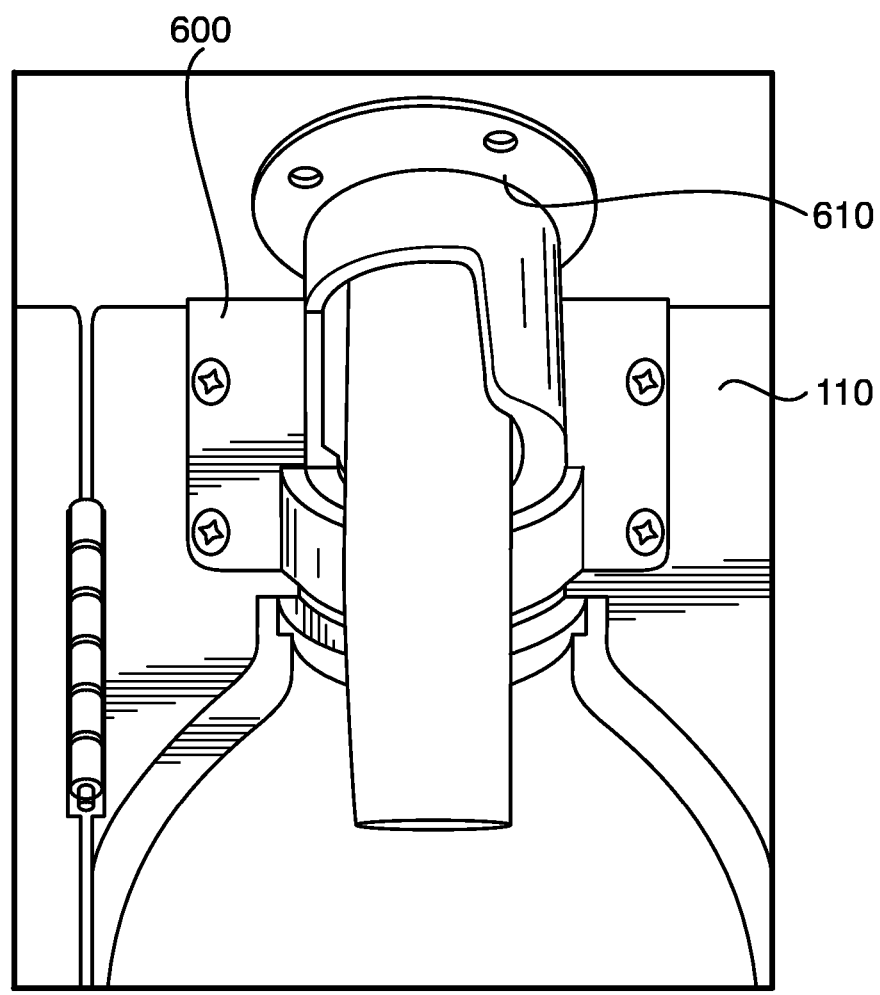
FIG. 6 is an illustration of a retention feature and an air valve in the assembly unit.
Figure 7:
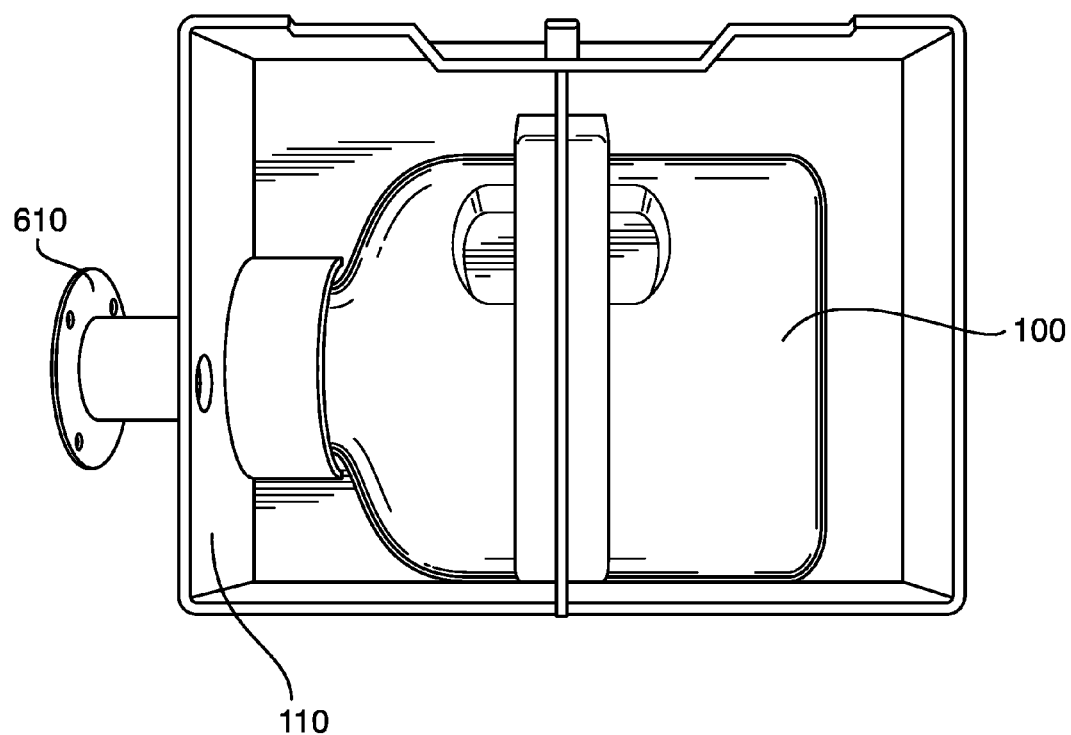
FIG. 7 is an illustration of the assembly unit, the air valve and the container.

When closed and containing an assembled bottle 100, a fitment retention feature 600 (FIG. 6) may have a through opening connecting the outside of the device to the fitment 150 and the liner inside of the bottle. It is then possible for an operator to push the assembly device against an air valve 610. The air valve 610 can be activated during contact between the assembly device 110 and the valve 610. Similarly contact could activate a timed or measured volume of air into the bottle 100, and the air could be introduced into the liner without requiring the fixture to contact a valve 610, but the air actuation could occur in some other manner (such as operator actuating a valve, automatic (computer-controlled) air burst, etc). The assembly device 110 may contact the bottle 100 to support the bottle 100 during the pressurized expansion process. This supports the glue joints and other faces of the bottle 100 to mitigate mechanical damage to the shell 125 135 or the glued areas 120 130.

The retention feature 600 may be removable and specific to the container 100 being manufactured. For example and not limitation, the container 100 may be for liquid laundry soap and the container 100 may contain a spout for pouring, including a drain hole to keep the spout clean. The retention feature 600 may be designed to accommodate the spout. The next run of containers 100 may be for milk and the milk may have a screw top. Referring briefly to FIGS. 10 and 11, the retention device 600 may have a cut out 1010 that allows the spout to fit into the retention device 500 without interference. The retention feature 600 may be easily removed and a new retention feature 600 specific to screw tops may be installed in the assembly device 110. Other filled materials and fitment details are possible and are contemplated. Face-mounted fitments are described in U.S. Pat. Nos. 6,237,308, 5,288,531, 4,709,528, 7,076,935, 6,874,299, 6,826,892, 6,794,053, 6,237,308, 5,363,966, and U.S. Patent Application No. 20060111224, which are incorporated herein by reference in their entirety.

As mentioned previously, there could also be features 500 (FIG. 5) to lock the assembly device 110 closed for the period of time required for glue curing. There could also be a force controlling feature 500 to ensure a specific pressure is applied to the glue surfaces. The fixture 500 can include a latch system to provide pressure upon the flanges 120 130 during a period of time required to obtain a sufficient bond. Depending on the adhesive used or the mechanical connection method used, the time and pressure required could vary widely. In an embodiment, a cam-style latch 500 is employed to give the operator flexibility in the amount of pressure exerted on the joint and in the amount of time the pressure is applied. It could be momentary, or last until the fixture 110 is opened and the container 100 removed.

Figure 8:
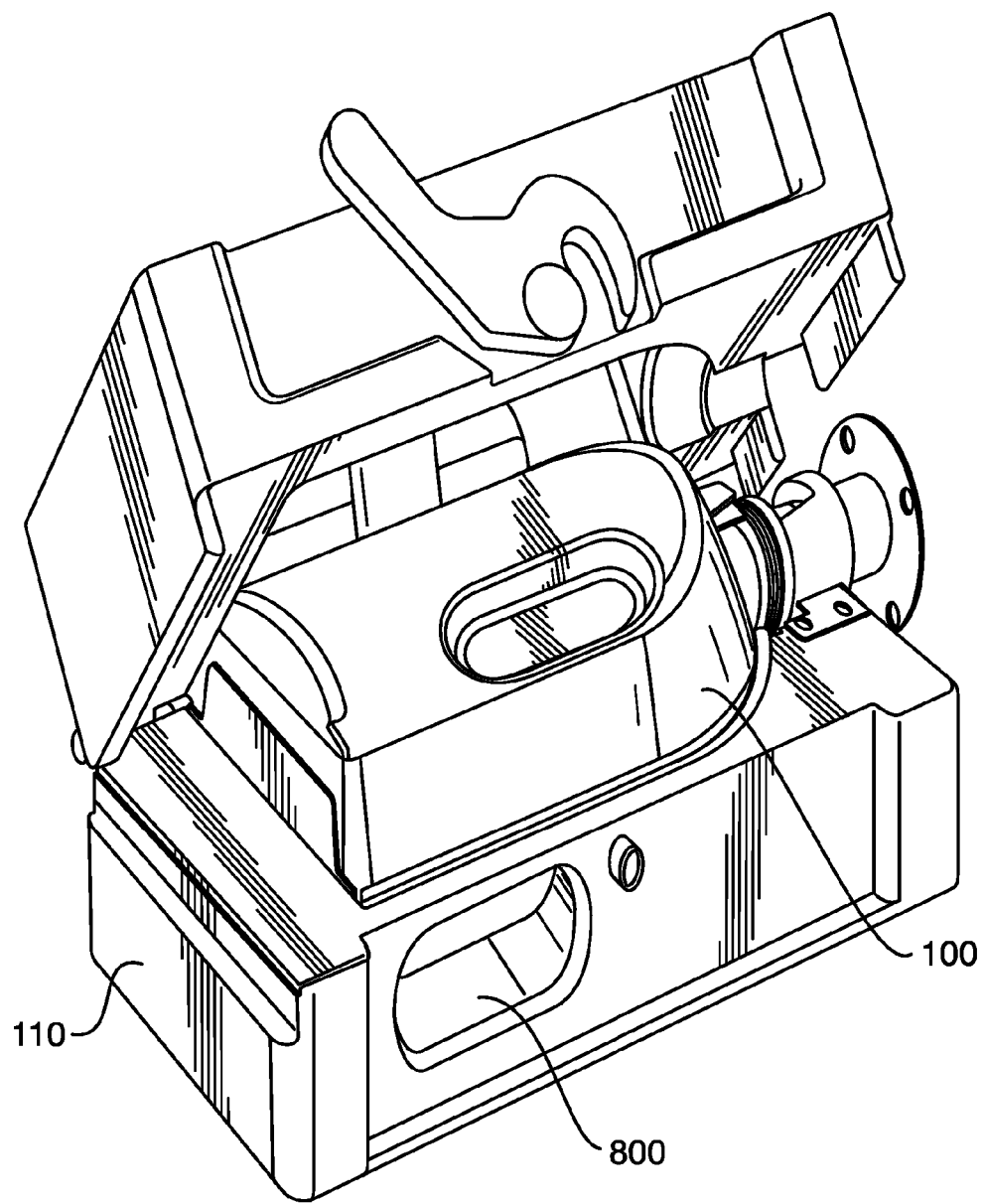
FIG. 8 is an illustration of a completed container being removed from the assembly unit.

The assembly device 110 may also have holes 800 (FIG. 8) to allow the assembled container 100 to be easily removed from the assembly device 110. For example, an operator could use a hand or other poking device to force the container 100 from the assembly device 110.

Figure 9:
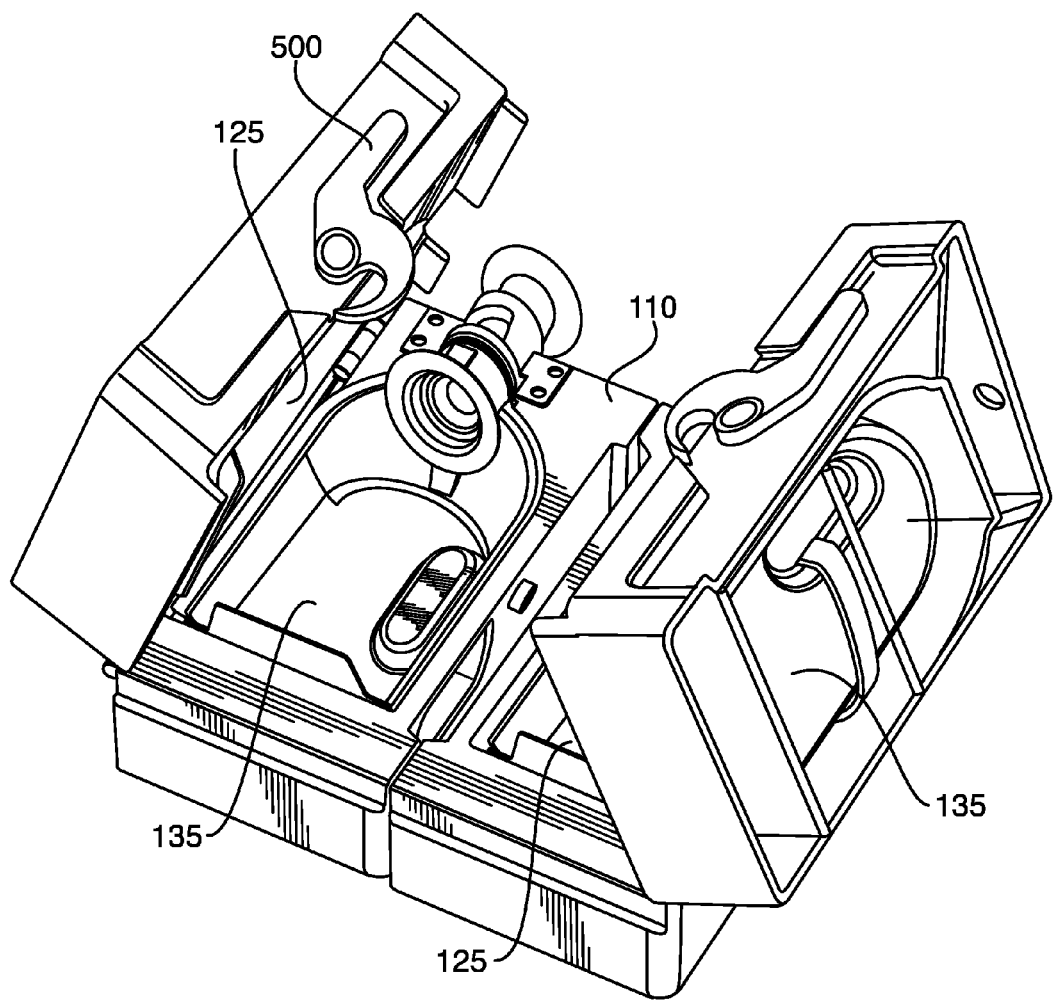
FIG. 9 is an illustration of an assembly unit with a plurality of cavities for a plurality of containers.

There may be a need to reduce the labour intensive nature of container assembly. Increasing the throughput per operator is possible in various ways. FIG. 9 may illustrate an embodiment where additional shells are held in the same device 110. The cavitation 500 of the bottle assembly device could hold a single container 100 or be greater so that it holds shells for 2, 3, 4 or more containers. The pressurized air could be distributed to the all cavities. Increased numbers of cavities can improve throughput performance to a point where the bottle assembly device is too large for a single operator to manage.

In some embodiments of the invention, as cavitation increases, lifting and closing the moving portion of the device 110, due to the increased weight and increased arc of the swing can become not feasible from a human factors and ergonomic point of view. An innovation is a multiple hinge version that keeps the size and weight of the individual folding portions of the assembly device small while the base (non moving part is larger for cavitation). For example there could be a 4 cavity base with 2 or four independently hinged top parts.

A multi-cavity version 100 could have a radial relation between the cavities. This unit 100 could rotate so that the operator(s) can move the cavity that they next need to attend to towards them. Similarly a 'lazy susan' surface could hold multiple single cavity units. It is conceived that air pressure for inflation of liners could be made available to the multiple cavities from a central pivot area, or could be external to the outer circumference. There are a range of ways to sequence air activation including translation of the cavity into a valve, all of which are contemplated. Rotary tables are common in packaging and fabrication industries, but it nonobvious to use this type of table in the assembly of a multi-component container comprising a molded pulp shell and a liner assembly comprising a polymer liner and a polymer weldspout.

The closing part or parts of the bottle assembly device 110 could be less than coplanar to the base. In effect partly closed, this could reduce the amount of travel that is required to close the assembly device 110. In some embodiments, only 90, or 100, or 120 degrees may be necessary to close the device. FIG. 9 may illustrate an example where less than 180 degrees may be needed for a two segment bottle. Less swing is easier and less energy consuming. However, it needs to be open enough to allow for easy access and insertion into the cavity or cavities.

Certain production facilities may be required to run different bottle 100 sizes and shapes. The mechanical configuration of the assembly device 110 is envisioned such that it has both standard features and features that are specific to a range of bottles 100. Common features could include frame, clasp, receiving features for bottle shell cavity 400, receiving features for fitment cavities, and the air valve interface. Variable components could be added to the common chassis. Variable features could include specific bottle cavity 400 shape, the fitment 150 cavity shape, handle or clasp for different pressure application, items to accommodate for different pulp wall thicknesses. In addition, in some embodiments, the bottle 100 may have double walls. There is a range of variation to the design that could be beneficial to the efficiencies of bottle 100 production, reduced capital outlay, necessary storage space, etc.

This same sort of assembly device 110 could be used in higher capacity or increased load carrying containers 100. It is envisioned that molded pulp parts 125 135 could be nested together and glued to create double-walled parts where the effective wall thickness can be increased. Further structural performance can be achieved if the double walls are connected at points but have space between each other in other areas, such as in corrugate cardboard and in hollow-core man-doors. This increases the effective thickness of the wall to be greater that of the two walls dimensional thickness. The assembly device 110 could use the above noted principles of registration, alignment, glue application, assistance to facilitate bonding these double walls together. It is understood that these double wall open shells can then go into a container assembly device 110 for the final steps of unifying the container 100. Or, it is the same assembly device 110 that help forms double walls has an ensuing sequence where to container 100 is then closed.

As a result of the various embodiments of the method and the assembly device 100 apparatus, improved pulp based containers 100 with fitments 150 and liners may be created. Pulp based containers 100 by their nature have more variability in size and shape which makes creating a consistent connection between the parts of the container 100 a challenge. By using the assembly apparatus 100, the container 100 may be made to have a more consistent and reliable connection between the different parts of the container 100. Some of the benefits may be a better appearing container 100, a stronger container 100, an improved connection between the fitment 150 and the container 100 that is twist resistant and pull resistant and less waste during container 100 manufacture as the assembly device 100 will ensure that the various parts that make up the container 100 line up appropriately on a reliable and consistent basis.

The invention claimed is:

1. A method of using an assembly device for a pulp-molded shell with a fitment to precisely create an integral pulp molded container comprising;

receiving a first surface of a first part of a formed pulp shell and a second surface of a second part of the formed pulp shell;

preparing a connection facilitator to assist in connecting the first part of the formed pulp shell and the second part of the formed pulp shell;

inserting the first part of the formed pulp shell and the second part of the formed pulp shell into cavities of the assembly device wherein the shells are in a non-closed state, registering and inserting the fitment into the assembly device;

aligning the fitment with the formed pulp shell; and closing the assembly device to connect the formed pulp shell parts together around the fitment.

2. The method of claim 1, wherein the connection facilitator comprises at least one selected from a group consisting of:
a mechanical connection;
a physical connection; and
an adhesive connection.

3. The method of claim 2, wherein the adhesive connection comprises an adhesive selected from a group consisting of:
a pressure sensitive adhesive;
a heat activated adhesive; and
a hot melted adhesive.

4. The method of claim 1, wherein the assembly device further comprises a latch system to apply pressure to the shell parts.

5. The method of claim 4, wherein the latch system applies a variety of pressure to the formed shell parts.

6. The method of claim 1, wherein the assembly device further comprises one or more alignment assistance devices wherein the alignment assistant device is selected from a group consisting of hinges, rods, pivots, guides, slots, chains, pistons and axles.

7. The method of claim 1, wherein the connection facilitator is an adhesive that is applied to the first or second part of the formed pulp shell while in the assembly device.

8. The method of claim 1, wherein the connection facilitator is an adhesive that is applied prior to assembly.

9. The method of claim 1, wherein the assembly device further comprises holes to allow the assembled container to be easily removed from the assembly device.

10. The method of claim 1, wherein the assembly device holds a plurality of containers.

11. The method of claim 1, wherein multiple assembly devices are taken in turn to be assembled.

12. The method of claim 1, wherein the assembly device comprises variable features that are replaceable for different bottle types and shapes.

13. The method of claim 12, wherein variable features comprises features selected from a group consisting of specific bottle cavity shape, the fitment cavity shape, handle or clasp for different pressure application, items to accommodate for different pulp wall thicknesses.

14. The method of claim 1, wherein the fitment is in communication with a liner.

15. A method of using an assembly device for a pulp-molded shell with a fitment to precisely create an integral pulp molded container comprising;
receiving a first surface of a first part of a formed pulp shell and a second surface of a second part of the formed pulp shell;
preparing a connection facilitator to assist in connecting the first part of the formed pulp shell and the second part of the formed pulp shell;
inserting the first part of the formed pulp shell and the second part of the formed pulp shell into cavities of the assembly device wherein the shells are in a non-connected state,
registering and inserting a first fitment in into the assembly device;
aligning the first fitment with the formed pulp shell;
closing the assembly device to connect the formed pulp shell parts together around the first fitment to create a first integral pulp molded container;
adjusting the assembly device for an additional integral pulp molded container with a second fitment;
receiving a first surface of a first part of the additional formed pulp shell and a second surface of a second part of the additional formed pulp shell;
preparing a connection facilitator to assist in connecting the first part of the additional formed pulp shell and the second part of the additional formed pulp shell;
inserting the first part of the additional formed pulp shell and the second part of the additional formed pulp shell into cavities of the assembly device wherein the first part and second part of the additional formed shells are in a non-connected state,
registering and inserting a second fitment into the assembly device;
aligning the second fitment with the additional formed pulp shell; and
closing the assembly device to connect the additional formed pulp shell parts together around the second fitment to create an additional integral pulp molded container.

16. The method of claim 15, wherein the first integral pulp molded container is adapted to interface with the first fitment and wherein the additional integral pulp molded container is adapted to interface with the second fitment.

17. The method of claim 15, wherein the first fitment comprises a different shape than the second fitment.

18. A method of using an assembly device for a pulp-molded shell with a fitment to precisely create an integral pulp molded container comprising;
receiving a first surface of a first part of a formed pulp shell of a first shape and a second surface of a second part of the formed pulp shell of the first shape;
preparing a connection facilitator to assist in connecting the first part of the formed pulp shell of a first shape and the second part of the formed pulp shell of the first shape;
inserting the first part of the formed pulp shell of the first shape and the second part of the formed pulp shell of the first shape into cavities of the assembly device designed for the first shape wherein the shells of the first shape are in a non-closed state,
registering and inserting a fitment into the assembly device;
aligning the fitment with the formed pulp shell of the first shape;
closing the assembly device to connect the formed pulp shell parts of the first shape; together around the fitment to create a first integral pulp molded container of the first shape;
adjusting the assembly device for a second integral pulp molded container of a second shape;
receiving a first surface of a first part of a formed pulp shell of a second shape and a second surface of a second part of the formed pulp shell of the second shape;
preparing a connection facilitator to assist in connecting the first part of the formed pulp shell of the second shape and the second part of the formed pulp shell of the second shape;
inserting the first part of the formed pulp shell of the second shape and the second part of the formed pulp shell of the second shape into cavities of the assembly device designed for the second shape wherein the shells of the second shape are in a non-closed state,
registering and inserting the fitment into the assembly device;
aligning the fitment with the formed pulp shell of the second shape; and closing the assembly device to connect the formed pulp shell parts of the second shape together around the fitment to create a first integral pulp molded container of a second shape.

19. The method of claim 18, wherein the first shape and the second shape are different shapes.

\* \* \* \* \*